(12) United States Patent
Holly

(10) Patent No.: US 11,846,227 B2
(45) Date of Patent: Dec. 19, 2023

(54) PRE-CHAMBER SPARK PLUG FOR A COMBUSTION CHAMBER OF A COMBUSTION ENGINE, COMBUSTION ENGINE, AND MOTOR VEHICLE

(71) Applicant: Mercedes-Benz Group AG, Stuttgart (DE)

(72) Inventor: Werner Holly, Merklingen (DE)

(73) Assignee: Mercedes-Benz Group AG, Stuttgart (DE)

(*) Notice: Subject to any disclaimer, the term of this patent is extended or adjusted under 35 U.S.C. 154(b) by 0 days.

(21) Appl. No.: 17/907,925

(22) PCT Filed: Feb. 11, 2021

(86) PCT No.: PCT/EP2021/053259
§ 371 (c)(1),
(2) Date: Aug. 29, 2022

(87) PCT Pub. No.: WO2021/175551
PCT Pub. Date: Sep. 10, 2021

(65) Prior Publication Data
US 2023/0010739 A1    Jan. 12, 2023

(30) Foreign Application Priority Data
Mar. 4, 2020   (DJ) ...................... 10 2020 001 385.6

(51) Int. Cl.
F02B 19/12   (2006.01)
F02B 19/10   (2006.01)

(52) U.S. Cl.
CPC .......... F02B 19/12 (2013.01); F02B 19/1014 (2013.01); F02B 19/1023 (2013.01)

(58) Field of Classification Search
CPC ... F02B 19/12; F02B 19/1014; F02B 19/1023
(Continued)

(56) References Cited

U.S. PATENT DOCUMENTS 7,021,280 B2   4/2006 Nomura
2008/0245902 A1 10/2008 Hou
(Continued)

FOREIGN PATENT DOCUMENTS

CN   1632302 A   6/2005
CN   1641192 A   7/2005
(Continued)

OTHER PUBLICATIONS

PCT/EP2021/053259, International Search Report dated Mar. 19, 2021 (Two (2) pages).
(Continued)

*Primary Examiner* — Mahmoud Gimie
(74) *Attorney, Agent, or Firm* — Crowell & Moring LLP

(57) ABSTRACT

A pre-chamber spark plug for a combustion chamber of a combustion engine includes a pre-chamber which has a plurality of openings and an electrode device which is disposed in the pre-chamber. An ignition spark for igniting a fuel-air mixture introduced into the pre-chamber is generatable at a spark location in the pre-chamber by the electrode device. The pre-chamber spark plug is configured to bring about a tumble-shaped flow of fuel-air mixture flowing into the pre-chamber via the plurality of openings. The tumble-shaped flow has, in a first region of the pre-chamber, a first flow part pointing upward away from the plurality of openings, and, in a second region of the pre-chamber, a second flow part adjoining the first flow part and pointing downward in a direction of the plurality of openings. The spark location is disposed at least in part in the second region.

8 Claims, 1 Drawing Sheet

(58) Field of Classification Search
USPC .......................................................... 123/260
See application file for complete search history.

(56) References Cited

U.S. PATENT DOCUMENTS

| | | |
|---|---|---|
| 2013/0055986 A1 | 3/2013 | Tozzi et al. |
| 2015/0184578 A1 | 7/2015 | Oda et al. |
| 2017/0218913 A1 | 8/2017 | Kanehara et al. |
| 2019/0048784 A1* | 2/2019 | Ashizawa ............ F02B 19/1023 |
| 2021/0348544 A1 | 11/2021 | Holly |

FOREIGN PATENT DOCUMENTS

| | | |
|---|---|---|
| CN | 107332109 A | 11/2017 |
| DE | 10 2012 223 640 A1 | 6/2014 |
| DE | 10 2018 117 726 A1 | 2/2019 |
| DE | 10 2018 007 093 A1 | 3/2020 |
| EP | 2 700 796 A1 | 2/2014 |
| EP | 2 927 458 A1 | 10/2015 |
| EP | 3 536 924 A1 | 9/2019 |
| JP | 54-69605 A | 6/1979 |
| JP | 2-153221 A | 6/1990 |
| JP | 8-284665 A | 10/1996 |
| JP | 2006144648 A * | 6/2006 |
| JP | 2012-211594 A | 11/2012 |

OTHER PUBLICATIONS

German-language German Office Action issued in German application No. 10 2020 001 385.6 dated Oct. 14, 2020 (Eight (8) pages).

U.S. Patent Application, "Pre-Chamber Spark Plug for a Combustion Chamber of an Internal Combustion Engine, Internal Combustion Engine, and Motor Vehicle", filed Sep. 2, 2022, Inventor: Werner Holly.

U.S. Patent Application, "Pre-Chamber Spark Plug for a Combustion Chamber of a Combustion Engine, Combustion Engine, and Motor Vehicle", filed Sep. 2, 2022, Inventor: Werner Holly.

Chinese Office Action issued in Chinese Application No. 202180018677.6 dated Jul. 29, 2023, with partial English translation (13 pages).

Japanese Office Action issued in Japanese Application No. 2022-552505 dated Aug. 15, 2023, with English translation (9 pages).

* cited by examiner

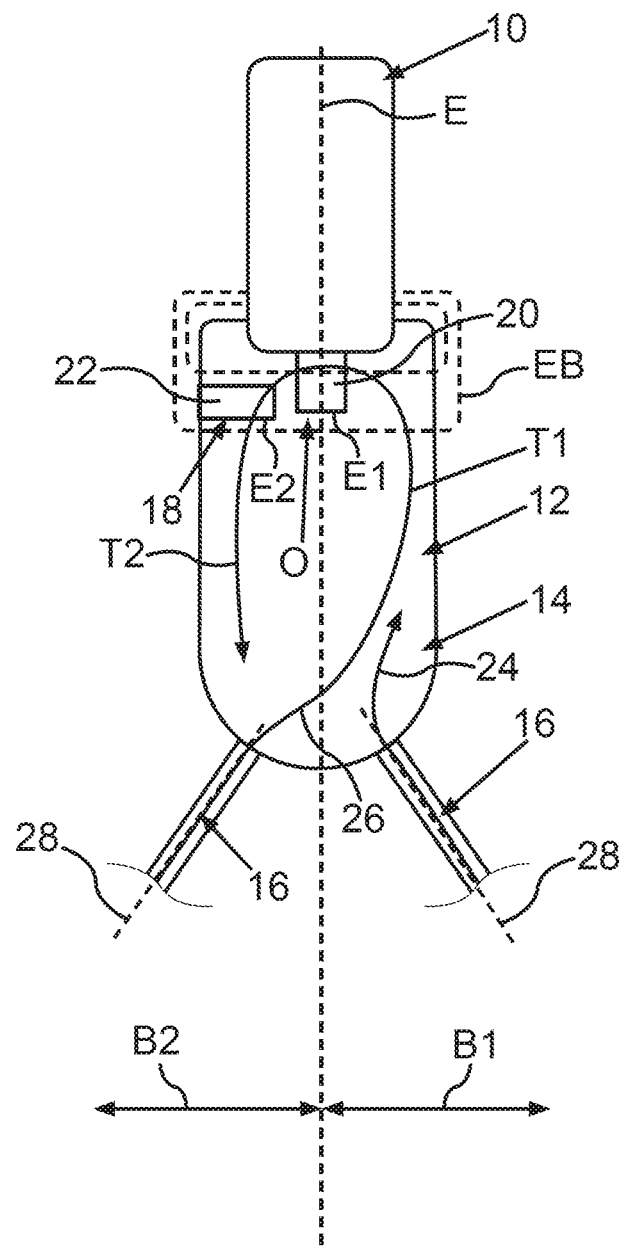

PRE-CHAMBER SPARK PLUG FOR A COMBUSTION CHAMBER OF A COMBUSTION ENGINE, COMBUSTION ENGINE, AND MOTOR VEHICLE

BACKGROUND AND SUMMARY OF THE INVENTION

The invention relates to a pre-chamber spark plug for a combustion chamber of a combustion engine, in particular of a motor vehicle. Furthermore, the invention relates to a combustion engine for a motor vehicle. The invention also relates to a motor vehicle, in particular a motor car.

EP 2 700 796 A1 discloses a precombustion chamber tip of a precombustion chamber arrangement of an internal combustion engine. Furthermore, a precombustion chamber is known from US 2013/0055986 A1. In addition, a pre-chamber spark plug for a combustion chamber of a combustion engine can be considered to be known from DE 10 2018 007 093 A1. JP 2012-211594 A discloses a spark plug. In addition, DE 10 2018 117 726 A1 discloses a combustion engine.

The object of the present invention is to provide a pre-chamber spark plug for a combustion chamber of a combustion engine, a combustion engine having at least one such pre-chamber spark plug, and a motor vehicle, such that particularly advantageous operation of the combustion engine can be realized.

A first aspect of the invention relates to a pre-chamber spark plug for a combustion chamber of a combustion engine, also referred to as an internal combustion engine, in particular for a motor vehicle. The pre-chamber spark plug has a pre-chamber with a plurality of openings, for example in the form of through-openings, via which the pre-chamber is fluidically connectable to the combustion chamber. In particular, the opening can run straight, or rather in a straight line, preferably over its entire length. A fuel-air mixture, also referred to simply as a mixture, can be introduced from the combustion chamber into the pre-chamber via the various openings.

The pre-chamber spark plug additionally comprises at least one electrode device, which in particular is arranged at least partially in the pre-chamber or protrudes at least partially into the pre-chamber, and which can be used to generate at least one ignition spark at least at one spark location in the pre-chamber in order to ignite the fuel-air mixture introduced into the pre-chamber. For this purpose, the electrode device has, for example, at least or precisely two electrodes, wherein, for example, one of the electrodes is referred to also as the first electrode and the other electrode is referred to also as the second electrode. The electrodes, in particular their respective ends or tips arranged in the pre-chamber, are for example distanced from one another, so that, for example, the electrodes, in particular their free ends or tips, form or delimit a spark region, in which the ignition spark can be generated, in particular between the electrodes and very particularly between the ends of the electrodes. For example, the spark location is thus the spark region, in which, for example during fired operation of the combustion engine, the ignition spark is generated by means of the electrodes and in particular between the electrodes, in particular between the ends of the electrodes, within each cycle of the combustion engine.

By means of the ignition spark, the fuel-air mixture, also referred to simply as the mixture, which has flowed into the pre-chamber via the opening can be sparked or ignited and subsequently burned in the pre-chamber so that, for example, flames or burning flares resulting from the ignition and combustion of the mixture can flow out of the pre-chamber via the openings and can flow or pass into the combustion chamber. As a result, the mixture remaining in the combustion chamber is ignited in the combustion chamber.

Each opening has a flow cross-section through which the fuel-air mixture or the corresponding flare can flow. The flow cross-section is, for example, an area through which the mixture can flow or has an area or surface area and can be passed through by the mixture. In particular, the flow cross-section is to be understood to be the smallest or lowest flow cross-section of each opening through which the mixture can flow.

In order to now be able to realize a particularly advantageous operation of the combustion engine, it is provided in accordance with the invention that the pre-chamber spark plug is configured to cause a tumble-shaped flow of the fuel-air mixture flowing into the pre-chamber via the openings. This shall be understood to mean that the pre-chamber spark plug imparts a tumble-shaped and thus cylindrical flow, also referred to as tumble flow, onto the mixture flowing through the openings and thus flowing into the pre-chamber via the openings, so that the tumble-shaped flow of the fuel-air mixture occurs or takes place in the pre-chamber. The tumble-shaped flow is a cylindrical flow of the mixture in the pre-chamber. The cylindrical flow runs here cylindrically around a, in particular imaginary or virtual, cylinder axis, wherein this cylinder axis runs for example perpendicularly to a, in particular imaginary or virtual, axis of the pre-chamber spark plug, in particular of the pre-chamber. The stated axis is, for example, a longitudinal axis, longitudinal central axis or main axis of the pre-chamber spark plug, in particular of the pre-chamber. The pre-chamber is, for example, rotationally symmetrical with respect to the axis or the longitudinal central axis. In particular, the axis runs in the longitudinal direction of the pre-chamber spark plug or of the pre-chamber. It is also conceivable that the cylinder axis runs perpendicularly to a plane and thus is a plane normal of the plane, wherein the tumble-shaped flow runs in a tumble shape or cylindrically in the stated plane. Here, the aforementioned plane runs parallel to the aforementioned axis, or the aforementioned axis runs in the stated plane, which is also referred to as a cylinder plane. In particular, the tumble-shaped flow of the mixture in the pre-chamber can be realized by an appropriate choice and/or configuration of the openings, in particular in respect of a number and/or arrangement of the openings, in particular around the aforementioned axis and/or in respect of their flow cross-section, in particular in respect of the shape and/or size thereof.

The tumble-shaped flow occurring or taking place in the pre-chamber in particular within each cycle during fired operation comprises, in a first region, in particular in a first half, of the pre-chamber a flow part pointing upward away from the openings. In addition, the tumble-shaped flow occurring or taking place in the pre-chamber comprises in a second region, in particular in a second half, of the pre-chamber a second flow part adjoining the first flow part and pointing downward in the direction of the openings. For example, the stated regions or halves of the pre-chamber are of equal size, wherein the pre-chamber is divided into the regions or into the halves for example by a parting plane. The parting plane is an imaginary or virtual plane, wherein the parting plane runs, for example, perpendicularly to the aforementioned cylinder plane. In particular, the parting plane runs parallel to the stated axis, or the axis runs in the parting plane. Furthermore, it is provided in accordance with the invention that the spark location is arranged at least partly, in particular at least predominantly or completely in the second region. If the pre-chamber spark plug for example has a plurality of spark locations in the pre-chamber, at each of which at least one ignition spark can be generated, it is thus conceivable that at least one of the spark locations, a plurality of the spark locations but not all spark locations, or all spark locations, in each case at least in part, in particular predominantly or completely, is or are arranged in the second region, in which the tumble-shaped flow or the second flow part points downward, that is to say is directed downward. The first flow part is also referred to as an upwardly directed flow part or is the to be directed upward.

In comparison with conventional pre-chamber spark plugs, a rapid convection of an initial flame core in the direction of the openings, also called nozzles or formed as nozzles, can be realized by the arrangement of the spark location in the second region. This leads to a particularly quick flame exit from the pre-chamber, thus resulting in an extended low-load capacity. In particular, the flame exit shall be understood to mean that the aforementioned, burning flares flow out from the pre-chamber via the openings. In addition, it is possible to achieve a configuration of the electrodes of the pre-chamber ignition plug in a manner more favourable to combustion, in particular with regard to a lower penetration depth at least of one of the electrodes, wherein the at least one electrode is formed, for example, as a so-called ground electrode. This results in a smaller surface area, which in turn results in lower wall heat losses. This can reduce the tendency for preignition compared to conventional pre-chamber spark plugs.

In conventional pre-chamber spark plugs, in particular with an arrangement, in particular of the spark location, that is rotationally symmetrical in particular in relation to the axis, it is disadvantageous that an initial flame core is not convected or is convected away from the openings, which are also referred to as pre-chamber nozzles. In order to achieve a sufficiently rapid flame core convection to the openings in conventional pre-chamber spark plugs, a particularly long electrode must usually be used that projects deep into the pre-chamber. This results in a jagged surface in the pre-chamber and a large dead volume. The previously mentioned problems and disadvantages can now be avoided with the pre-chamber spark plug according to the invention.

In particular, compared to conventional solutions, the combustion of the mixture in the pre-chamber can be improved by the described arrangement of the spark location in the second region. Since the spark location is arranged in the second region, and since the tumble-shaped flow is directed downward in the second region, the spark location is arranged in the downwardly directed flow part, which is also referred to as a downwardly directed tumble path or downwardly directed tumble flow path, or flows along a downwardly directed tumble path or downwardly directed tumble flow path. Due to the arrangement of the spark location in the downwardly directed tumble path, the working area of the pre-chamber spark plug can be increased in comparison to conventional solutions, so that a more stable ignition when idling and a longer preignition risk with preload can be realized. Furthermore, the improved combustion results in a greater pressure rise in the pre-chamber and consequently a deeper flare penetration depth into the combustion chamber. This also improves combustion in the main combustion chamber. The flare penetration depth shall be understood to mean a distance, a depth or path over which the various flares penetrate into the pre-chamber or combustion chamber. Each flare results from the fact that the mixture is ignited in the pre-chamber and subsequently burned.

Further findings forming the basis of the invention are that pre-chamber spark plugs usually can be differentiated according to the flow structure in the pre-chamber. In particular, in respect of conventional pre-chamber spark plugs, a distinction can be made between structureless (chaotic) flow forms in the pre-chamber and rotationally symmetrical flow forms. The flow structure is determined by the arrangement of the openings and by a corresponding configuration of the openings. The openings are traditionally arranged rotationally symmetrically about the axis, which is, for example, the main axis of the pre-chamber. This results in rotationally symmetrical flow structures in the pre-chamber.

In accordance with the invention, each opening is formed as a bore. Alternatively or additionally, it is provided that the flow cross-sections of at least two of the openings differ from each other with regard to their shape. Alternatively or additionally, it is provided that the openings are arranged along an imaginary or virtual circle of which the imaginary or virtual center lies on the imaginary or virtual axis, so that, for example, the openings are arranged around the axis consecutively along the circle. This can be understood to mean in particular that the respective center points or geometric centers of gravity, in particular the centers of gravity, of the areas of the openings or the flow cross-sections are arranged on the imaginary circle and along the circle, in particular consecutively. Based on an imaginary or virtual dividing plane, in which the axis runs, splitting the circle into two halves of equal size or into two parts of equal size or equal length, the sum of the flow cross-sections of the openings arranged in or on a first of the halves of the circle is greater than the sum of the flow cross-sections of the openings arranged on or in the second half of the circle. In order to produce particularly advantageous flow conditions and thus a particularly advantageous operation, it is provided here that the pre-chamber is rotationally symmetrical with respect to the axis.

The dividing plane is preferably the aforementioned parting plane. For example, the first half of the circle, also referred to as the first circle half, is arranged, in particular completely, in one of the regions of the pre-chamber, in particular in the first region, wherein the second half of the circle, also referred to as the second circle half, is preferably arranged, in particular completely, in the other region of the pre-chamber, in particular in the second region. As a result of this embodiment of the flow cross-sections, the openings can be made to or are configured to bring about the tumble-shaped flow of the fuel-air mixture flowing into the pre-chamber via the openings. In other words, in fired operation of the combustion engine, the openings, in particular also as a result of their arrangement and/or their number and/or their geometry, and, in accordance with the invention, since the sum of the or all flow cross-sections of the openings arranged on the first circle half is greater than the sum of the or all flow cross-sections of the openings arranged on the second circle half, bring about a or the at least substantially tumble-shaped flow of the fuel-air mixture, referred to simply also as a mixture and flowing through the opening and thus flowing from the combustion chamber into the pre-chamber. Again, expressed differently, the openings formed for example as through-openings impart an at least substantially tumble-shaped and thus cylindrical flow, also referred to as a tumble flow, onto the mixture flowing through the openings and thus flowing from the combustion chamber into the pre-chamber, so that a particularly advantageous operation of the pre-chamber spark plug and thus of the combustion engine as a whole can be achieved.

Since the sum of the flow cross-sections of the openings arranged on the first circle half is greater than the sum of the flow cross-sections of the openings arranged on the second circle half, it is provided in accordance with the invention that the openings formed as bores are arranged rotationally asymmetrically with respect to the stated axis or about the axis. This rotationally asymmetrical configuration can comprise or include here a corresponding positioning and/or the flow cross-section of the particular opening also referred to as the cross-sectional area or comprising a cross-sectional area.

In other words it can be provided that the openings are arranged rotationally asymmetrically about the axis, that is to say with respect to the axis. This means, for example, in particular that the openings are arranged on the whole asymmetrically, i.e., unevenly distributed, about the axis and thus in the circumferential direction of the pre-chamber or pre-chamber running about the axis. Alternatively or additionally, the feature that the openings are arranged or formed rotationally asymmetrically about the axis can be understood to mean that at least two of the openings differ from one another in their geometry, in particular in the geometry of their respective flow cross-sections, and in so doing have a rotationally asymmetrical sequence, in particular around the axis. This means in particular that the flow cross-sections of these at least two openings differ from one another, in particular with regard to their shape and/or size, i.e., area or surface area, wherein the at least two openings or preferably all the openings have a rotationally asymmetrical sequence around the axis. This means in particular that the at least two openings or preferably all openings around the axis follow each other in an uneven or disordered manner, i.e., not according to a regular sequence.

In contrast to a rotationally asymmetrical arrangement of the openings around the axis and in contrast to a possible resultant rotationally symmetrical flow, which for example extends helically or annularly about the main axis of the pre-chamber, the tumble-shaped flow is a cylindrical flow, also referred to as a cylinder flow, which extends for example at least in part in the cylinder plane or runs in the cylinder plane, in which the main axis lies.

It has proven to be particularly advantageous if the openings are configured to bring about the tumble-shaped flow of the fuel-air mixture flowing into the pre-chamber via the openings. Particularly advantageous flow conditions can thus be produced in the pre-chamber, such that a particularly advantageous combustion of the mixture and consequently a particularly advantageous operation can be ensured.

A further embodiment is distinguished in that at least two of the openings have different flow cross-sections, in particular diameters, through which the mixture can flow.

In a particularly advantageous embodiment of the invention it is provided that the axis runs in the longitudinal direction of the pre-chamber, whereby a particularly advantageous operation can be implemented.

A further embodiment is distinguished in that the or all flow cross-sections of the openings arranged on the first circle half are larger than the or all flow cross-sections of the openings arranged on the second circle half. Particularly advantageous flow conditions and thus particularly advantageous operation can thus be ensured.

In a particularly advantageous embodiment of the invention it is provided that a or the number of the or all openings arranged on the first half is greater than a or the number of the or all openings arranged on the second half. An advantageous tumble-shaped flow can thus be produced particularly advantageously, so that a particularly advantageous operation can be produced.

In order to be able to produce a particularly advantageous operation in a particularly simple and reliable way, it is provided in a further embodiment of the invention that the or all openings are circular, so that the openings each have a particular diameter. Here, it is provided in particular that the or all flow cross-sections are each circular and thus have the particular diameter. Here, it is preferably provided that the or all diameters of the first openings arranged on the first half are larger than the or all diameters of the second openings arranged on the second half.

In a further embodiment of the invention, the mean value of the or all flow cross-sections of the openings arranged on the first circle half is larger than the mean value of the or all flow cross-sections of the openings arranged on the second circle half. The mean value shall preferably be understood to mean the arithmetic mean value, also referred to as the arithmetic mean, which is calculated, for example, by dividing, that is to say splitting, the sum of the flow cross-sections of the openings arranged on a particular circle half by the number of openings arranged on the particular circle half.

A second aspect of the invention relates to a combustion engine, preferably in the form of a reciprocating piston engine, for a motor vehicle, which may preferably be in the form of a motor car and very preferably in the form of a passenger car or a commercial vehicle. The combustion engine has at least one combustion chamber. The combustion chamber is, for example, delimited by a cylinder and by a piston of the combustion engine arranged in the cylinder such that the piston can move in translation, wherein the cylinder is formed or delimited, for example, by an engine housing of the combustion engine formed in particular as a crankcase or cylinder crankcase. In addition, the combustion chamber is, for example, partially delimited by a combustion chamber roof, which is formed, for example, by a cylinder head formed separately from the engine housing and connected to the engine housing.

The combustion engine additionally comprises at least one pre-chamber spark plug which is associated with the combustion chamber and which, for example, is at least partially arranged in the combustion chamber.

The pre-chamber spark plug comprises a pre-chamber with a plurality of openings via which the pre-chamber is fluidically connected to the combustion chamber, which is also referred to as the main combustion chamber. A fuel-air mixture, also referred to simply as a mixture, can be introduced or can flow into the pre-chamber from the combustion chamber via the openings. In other words, for example, the aforementioned fuel-air mixture is formed in the combustion chamber or the fuel-air mixture is introduced into the combustion chamber. For example, fuel, in particular liquid fuel, and air are mixed in the combustion chamber. For example, the fuel is injected directly into the combustion chamber. The aforementioned mixture comprises here the air and the fuel that are or have been introduced into the combustion chamber. At least part of the mixture from the combustion chamber can flow through the openings and thus enter the pre-chamber via the openings. In the pre-chamber, the part of the mixture can be ignited and burned, resulting in the flares described previously. The flares can then flow out of the pre-chamber via the openings and can flow into the main combustion chamber, where they ignite the rest of the mixture. Each opening has here, for example, a flow cross-section through which the mixture or each flare can flow.

In order to now be able to realize a particularly advantageous operation, it is provided in accordance with the invention that the pre-chamber spark plug, in particular the openings, is or are configured to bring about, in particular in the pre-chamber, a tumble-shaped flow of the fuel-air mixture flowing into the pre-chamber via the openings. Here, the tumble-shaped flow occurring or taking place in the pre-chamber comprises, in a first region of the pre-chamber, a first flow part pointing upward away from the openings and thus directed upward and, in a second region of the pre-chamber, a second flow part adjoining the first flow part, pointing downward in the direction of the openings and thus directed downward.

In addition, an electrode device of the pre-chamber spark plug is arranged in the pre-chamber. At least one spark ignition for igniting the mixture introduced into the pre-chamber can be generated by means of the electrode device, at least at one spark location in the pre-chamber. Here, the spark location is arranged at least in part, in particular at least predominantly or completely, in the second region. In accordance with the invention it is provided that the openings are formed as bores. Alternatively or additionally, it is provided that the flow cross-sections of at least two of the openings differ from each other with respect to their shape. Alternatively or additionally, it is provided that the openings are arranged along an imaginary circle, the center of which lies on an imaginary axis, wherein, based on an imaginary plane dividing the circle into two halves of equal size, in which the axis runs, the sum of the flow cross-sections of the openings arranged on a first of the halves is greater than the sum of the flow cross-sections of openings arranged on the second half, wherein the pre-chamber is rotationally symmetrical with respect to the axis.

Advantages and advantageous embodiments of the first aspect of the invention are to be regarded as advantages and advantageous embodiments of the second aspect of the invention, and vice versa.

Further advantages, features and details of the invention will become apparent from the following description of a preferred exemplary embodiment and from the drawing. The features and combinations of features mentioned above in the description, as well as the features and combinations of features mentioned below in the FIGURE description and/or shown alone in the sole FIGURE, can be used not only in the combination indicated in each case, but also in other combinations or on their own, without departing from the scope of the invention.

BRIEF DESCRIPTION OF THE DRAWING

The drawing shows, in the sole FIGURE, a schematic and sectional side view of a pre-chamber spark plug according to the invention for a combustion chamber of a combustion engine of a motor vehicle.

DETAILED DESCRIPTION OF THE DRAWING

The sole FIGURE shows, in a schematic and sectional side view, a pre-chamber spark plug 10 for a combustion chamber, formed for example by a cylinder or as a cylinder or delimited by a cylinder, of a combustion engine, formed for example as a reciprocating piston engine, of a motor vehicle, in particular a motor car, such as a passenger car or commercial vehicle. The motor vehicle can be driven by means of the combustion engine. The pre-chamber spark plug 10 has at least one or exactly one pre-chamber 12, the contour of which is denoted by 14 in FIG. 1. The pre-chamber 12 has a plurality of openings 16, also referred to as nozzles and formed in the present case as through-openings, via which the pre-chamber 12 is fluidically connected to the combustion chamber. In its fully manufactured state, the combustion engine has the aforementioned combustion chamber and the pre-chamber spark plug 10, so that in the fully manufactured state of the combustion engine, the pre-chamber spark plug 12 is fluidically connected to the combustion chamber via the openings 16. As a result, a fuel-air mixture, also referred to simply as a mixture, from the combustion chamber, can at least partially flow through the openings 16 and can thus flow into the pre-chamber 12, so that at least part of the fuel-air mixture, also referred to simply as a mixture, from the combustion chamber can flow through the openings 16 and can thus flow into the pre-chamber 12 via the openings 16.

The pre-chamber spark plug 10 furthermore has an electrode device 18, which is arranged at least in part in the pre-chamber 12. The electrode device 19 comprises a first electrode 20 and a second electrode 22, wherein the electrodes 20 and 22, in particular their corresponding free ends E1, and E2, are arranged in the pre-chamber 12. The ends E1 and E2, which are arranged in the pre-chamber 12, are distanced here from one another and consequently do not touch. The first electrode 20, for example, is a so-called middle electrode, wherein the second electrode 22, for example, is a so-called ground electrode. At least one or precisely one ignition spark can be generated by means of the electrodes 20 and 22 and thus by means of the electrode device 18, in particular during fired operation and within each cycle of the combustion engine, at least at or precisely at a spark location O in the pre-chamber 12. The mixture, which has passed into the pre-chamber 12 via the openings 16, is ignited by means of the ignition spark and is subsequently burned. It can be seen from the FIGURE that the electrodes 20 and 22, in particular their ends E1 and E2, define, delimit or bound the spark location O for the ignition spark, also referred to as the ignition location. For example, the spark location O is at least partially, in particular at least predominantly or completely, between the electrodes 20 and 22, in particular between the ends E1 and E2. Expressed again in other words, the ignition spark is created at the spark location O, or the ignition spark spreads out from the spark location. This means in particular that, by means of the electrodes 20 and 22, the at least one ignition spark can be provided at the spark location O, also referred to as the spark location, in the pre-chamber 12. Burning flares result from the ignition and the resultant burning of the mixture in the pre-chamber 12 and flow through the openings 16 and thus flow out of the pre-chamber 12 and into the combustion chamber via the openings 16. As a result, for example, a further part of the mixture remaining in the combustion chamber is ignited and subsequently burned, thus driving the aforementioned piston.

The pre-chamber spark plug 10, in particular the openings 16, is or are now configured to bring about a tumble-shaped flow of the mixture flowing into the pre-chamber 12 via the openings 16, shown in the FIGURE by arrows 24 and 26 and also referred to as a cylindrical flow, cylinder flow or tumble flow. This means that the tumble-shaped flow of the mixture occurs or takes place at least in the pre-chamber 12. In particular, the arrows 24 and 26 shown in FIG. 1 show a contour of the tumble-shaped flow also referred to as a flow contour.

Furthermore, it can be seen in particular with reference to the arrow 26 that the tumble-shaped flow taking place or occurring in the pre-chamber 12 comprises a flow part T1 which points away upwardly from the openings 16 and which is arranged or occurs in a first region B1 of the pre-chamber 12. In addition, the tumble-shaped flow comprises a second flow part T2, which adjoins the first flow part T1, points downwardly in the direction of the openings 16, and is arranged or occurs, runs or takes place in a second region B2 of the pre-chamber 12. It can also be seen from the FIGURE that the region B1 is a first half and the region B2 is a second half of the pre-chamber 12, wherein the halves are of equal size. Here, the pre-chamber 12 for example is divided into the regions B1 and B2 by an imaginary, or virtual parting plane E, in which a or the main axis of the pre-chamber spark plug 10 or pre-chamber 12 runs. The pre-chamber 12 is, for example, at least substantially rotationally symmetrical with respect to the main axis. A plurality of first openings 16 are arranged for example in the first half of the pre-chamber 12, wherein second openings 16 are arranged in the second half of the pre-chamber 12.

The parting plane E runs, for example, perpendicularly to a further cylinder plane shown in the FIGURE, with the main axis also running in the plane. Here, the tumble-shaped flow runs in a tumble shape in the stated cylinder plane. Due to the tumble-shaped flow, a volume V of the pre-chamber 12, also referred to as the dead volume, can be kept particularly low, so that a particularly large operating region of the pre-chamber spark plug 10 can be ensured. Furthermore, axes of the various openings 16 are denoted in the FIGURE by 28. For example, each opening 16 is rotationally symmetrical with respect to its particular axis 28 and is also circular, for example, so that, for example, the axis 28 in question runs in the longitudinal direction of the corresponding opening 16. The axis 28 in question coincides with a corresponding direction of passage along which the mixture can flow from the combustion chamber through the corresponding opening 16 and thus into the pre-chamber 12. In addition, for example, the particular flare resulting from the ignition of the mixture in the pre-chamber 12 can flow through the corresponding opening 16 and thus flow out of the pre-chamber 12 into the combustion chamber. In this case, the opening 16 in question has a corresponding flow cross-section, through which the flare in question or the mixture can flow. In particular, if the opening 16 in question is circular or is embodied as or by a cylindrical bore, the flow cross-section in question, also referred to as the cross-section, of the corresponding opening 16 formed for example as a bore can be characterized by the diameter of the latter and can be circular here. In addition, an electrode region EB can be seen in the FIGURE, in which the electrodes 20 and 22, in particular their ends E1 and E2 and/or the spark location O are arranged.

The tumble flow referred to as a cylindrical flow has a flow center which is orthogonal to the main axis of the pre-chamber 12 and runs for example in the plane E. In particular, the flow center is a cylinder axis which runs orthogonal to the cylinder plane. The tumble flow runs cylindrically here around the cylinder axis, which for example runs in the parting plane E and perpendicularly to the main axis of the pre-chamber 12. In other words, the tumble flow can be defined as a flow structure in which the flow of the mixture flows in the first region B1 away from the bores in the direction of the electrode region EB and thus flows upward or in an upwardly directed manner to the electrodes 20 and 22, which is also referred to as an upward flow, then flows through the electrode region EB and then flows in the second region B2 away from the electrode region EB in the direction of the bores and thus downward, which is also referred to as the downward direction. Thus, the tumble flow is a structured flow form, which, however, is not rotationally symmetrical to the pre-chamber main axis.

LIST OF REFERENCE CHARACTERS

10 pre-chamber spark plug
12 pre-chamber
14 contour
16 opening
18 electrode device
20 electrode
22 electrode
24 arrow
26 arrow
28 axis
O spark location
B1, B2 region
E parting plane
EB electrode region
E1, E2 end
T1, T2 flow part
V volume

The invention claimed is:

1. A pre-chamber spark plug (10) for a combustion chamber of a combustion engine, comprising:
   a pre-chamber (12) which has a plurality of openings (16) and which is fluidically connectable to the combustion chamber via the plurality of openings (16), wherein a fuel-air mixture is introducible from the combustion chamber into the pre-chamber (12) via the plurality of openings (16); and
   an electrode device (18) which is disposed in the pre-chamber (12), wherein an ignition spark for igniting fuel-air mixture introduced into the pre-chamber (12) is generatable at a spark location (0) in the pre-chamber (12) by the electrode device (18);
   wherein the pre-chamber spark plug (10) is configured to bring about a tumble-shaped flow (26) of fuel-air mixture flowing into the pre-chamber (12) via the plurality of openings (16);
   wherein each of the plurality of openings (16) has a respective flow cross-section through which the fuel-air mixture is flowable;
   wherein the tumble-shaped flow (26) flows in a first region (B1) of the pre-chamber (12) pointing upward away from the plurality of openings (16) and then past the electrode device (18) and then in a second region (B2) of the pre-chamber (12) pointing downward in a direction of the plurality of openings (16);
   wherein the spark location (O) is disposed completely in the second region (B2);
   wherein the plurality of openings (16) are formed as bores;
   wherein the flow cross-sections of at least two of the plurality of openings (16) differ from each other with regard to a respective shape;
   wherein the plurality of openings (16) are disposed along an imaginary circle, wherein a center of the imaginary circle lies on an imaginary axis, wherein an imaginary plane in which the imaginary axis runs splits the imaginary circle into a first half and a second half of equal size, and wherein a sum of the flow cross-sections of first openings of the plurality of openings (16) disposed in the first half is greater than a sum of the flow cross-sections of second openings of the plurality of openings (16) disposed in the second half; and wherein the pre-chamber (12) is rotationally symmetrical with respect to the imaginary axis;

wherein the imaginary plane divides the pre-chamber (12) into the first region (B1) and the second region (B2).

2. The pre-chamber spark plug (10) according to claim 1, wherein the plurality of openings (16) are configured to bring about the tumble-shaped flow (26).

3. The pre-chamber spark plug (10) according to claim 1, wherein the imaginary axis runs in a longitudinal direction of the pre-chamber (12).

4. The pre-chamber spark plug (10) according to claim 1, wherein the flow cross-sections of the first openings disposed in the first half are larger than the flow cross-sections of the second openings disposed in the second half.

5. The pre-chamber spark plug (10) according to claim 1, wherein the flow cross sections of the first openings disposed in the first half are larger than the flow cross sections of the second openings disposed in the second half.

6. The pre-chamber spark plug (10) according to claim 4, wherein the plurality of openings (16) are circular such that the plurality of openings (16) each have a diameter and wherein the diameters of the first openings disposed in the first half are greater than the diameters of the second openings disposed in the second half.

7. A combustion engine for a motor vehicle, comprising:
a combustion chamber; and
the pre-chamber spark plug (10) according to claim 1.

8. A motor vehicle, comprising:
a combustion engine with a combustion chamber; and
the pre-chamber spark plug (10) according to claim 1.

* * * * *